United States Patent
Lukasse et al.

(10) Patent No.: US 9,528,745 B2
(45) Date of Patent: Dec. 27, 2016

(54) REDUCING OR AVOIDING ICE FORMATION IN AN INTERMITTENTLY OPERATED COOLING UNIT

(75) Inventors: Leijn Johannes Sjerp Lukasse, Ede (NL); Janneke Emmy De Kramer-Cuppen, Bennekom (NL)

(73) Assignee: Maersk Line A/S, Copenhagen (DK)

(*) Notice: Subject to any disclaimer, the term of this patent is extended or adjusted under 35 U.S.C. 154(b) by 1078 days.

(21) Appl. No.: 13/180,824

(22) Filed: Jul. 12, 2011

(65) Prior Publication Data
US 2013/0014521 A1 Jan. 17, 2013

(51) Int. Cl.
*F25D 21/00* (2006.01)
*F25B 47/00* (2006.01)
(Continued)

(52) U.S. Cl.
CPC ....... *F25D 21/04* (2013.01); *F25B 2600/0251* (2013.01); *F25D 11/003* (2013.01); *Y02B 40/32* (2013.01)

(58) Field of Classification Search
CPC ........ F25D 21/00; F25D 21/04; F25B 47/006; F25B 2600/025; F25B 2600/0251; F25B 2600/0252; F25B 47/02
(Continued)

(56) References Cited

U.S. PATENT DOCUMENTS 2,376,913 A * 5/1945 Grooms ............... F25B 49/025 236/91 A
3,738,120 A * 6/1973 Beatenbough .................. 62/229
(Continued)

FOREIGN PATENT DOCUMENTS

DE 102004001344 8/2004
EP 0899135 3/1999
JP 2004217036 8/2004

OTHER PUBLICATIONS

European Search Report from corresponding European Application No. EP11173529 dated Feb. 1, 2012.

*Primary Examiner* — Frantz Jules
*Assistant Examiner* — Erik Mendoza-Wilkenfe
(74) *Attorney, Agent, or Firm* — Renner, Otto, Boisselle and Sklar LLP (57) ABSTRACT

Disclosed is a system for and a method of reducing and/or avoiding ice formation inside a cooling space (41) of a refrigerated transport container (1) comprising at least a cooling unit (40) and an evaporator (16) located in the cooling space (41), where the cooling unit (40) comprises at least an intermittently operated compressor (6) operated between a first active state and a second less active state, and wherein the method comprises: reducing and/or avoiding ice formation inside the cooling space (41), when the system is operated at a temperature setpoint where a potential risk of ice build-up on the external surface of the evaporator exists, by altering a cycling of the compressor (6) between the first active state and the second less active state such that the number of melting-refreezing cycles at an external surface of the evaporator is reduced. In this way, ice formation in the cooling space is reduced and/or avoided, which helps to maintain a clean external evaporator surface area and open condensate collection guide(s) (20). This in turn helps to ensure the proper drain off of melting water to outside the container and the persistent proper functioning of the cooling unit.

11 Claims, 4 Drawing Sheets

(51) Int. Cl.
*F25D 21/04* (2006.01)
*F25D 11/00* (2006.01)

(58) Field of Classification Search
USPC .............. 62/157, 158, 228.1, 150, 272, 229
See application file for complete search history.

(56) References Cited

U.S. PATENT DOCUMENTS

| | | | |
|---|---|---|---|
| 4,021,213 A * | 5/1977 | Neidhardt | F25D 29/00 62/180 |
| 4,257,795 A * | 3/1981 | Shaw | 62/150 |
| 4,326,386 A | 4/1982 | Tamura | |
| 4,485,633 A * | 12/1984 | King | F25D 17/06 62/180 |
| 4,722,019 A | 1/1988 | Pohl | |
| 4,967,568 A * | 11/1990 | Harnden, Jr. | F25D 17/065 62/155 |
| 5,771,701 A * | 6/1998 | Suh | F25B 5/04 62/179 |
| 5,826,439 A * | 10/1998 | Baruschke | B60H 1/321 62/208 |
| 5,992,163 A | 11/1999 | Baruschke | |
| 6,170,271 B1 | 1/2001 | Sullivan | |
| 8,590,330 B2 * | 11/2013 | Walker et al. | 62/236 |
| 2004/0134207 A1 | 7/2004 | Morita | |
| 2005/0115259 A1* | 6/2005 | Ergarac et al. | 62/228.1 |
| 2005/0284164 A1* | 12/2005 | Ohta | 62/228.3 |
| 2007/0289318 A1* | 12/2007 | Nakamura | 62/150 |
| 2009/0044557 A1* | 2/2009 | Weber | F25B 13/00 62/277 |
| 2009/0193820 A1* | 8/2009 | Fotiadis | F25B 41/04 62/80 |
| 2010/0192618 A1* | 8/2010 | Zolli | F25B 49/02 62/428 |
| 2011/0016893 A1* | 1/2011 | Dawes | 62/89 |
| 2011/0100041 A1* | 5/2011 | Crawford | F25B 13/00 62/156 |

* cited by examiner

REDUCING OR AVOIDING ICE FORMATION IN AN INTERMITTENTLY OPERATED COOLING UNIT

Disclosed are a method of and a system for reducing or avoiding ice formation on and/or below evaporator coils of an intermittently operated cooling unit used to cool a refrigerated storage space, especially a refrigerated transport container.

BACKGROUND

Temperature in a refrigerated storage space is controlled within a temperature range adjacent to a setpoint temperature. The refrigerated storage space may for example comprise a transport volume of a refrigerated transport container. The setpoint temperature is chosen to keep the perishable produce such as meat, vegetables and fruit, at correct temperatures to avoid quality degradation. A lot of produce (e.g. chilled meat, grape, apple, pear, kiwi, dairy, etc.) is transported/stored at a temperature just above the freezing point of the produce, i.e. at setpoints in the range between about −5° C. and 0° C.

One typical cooling unit or refrigeration unit used in refrigerated transport containers is based on the so-called vapour compression refrigeration circuit and comprises a cooling space situated inside an insulated enclosure of the refrigerated transport container. This circuit comprises at least a compressor, a condenser, an expansion device, and an evaporator. The compressor sucks refrigerant vapour from the evaporator and compresses the refrigerant vapour which subsequently flows to the condenser at high pressure. The condenser ejects its heat to a medium outside the refrigerated transport container while condensing the refrigerant vapour. The liquefied refrigerant then flows to the expansion device in which a refrigerant pressure drops. The low pressure refrigerant then flows to the evaporator, situated in the cooling space, where the refrigerant evaporates while extracting the required heat from the refrigerated storage space.

Throughout this specification, the word ice indicates frozen water, a brittle transparent crystalline solid. The word frost means small white crystals formed when water vapour deposits from saturated air. Frost is formed when solid surfaces are cooled to below the so-called dew point of the adjacent air as well as below the freezing point of water.

Operating an evaporator at an external surface temperature below 0° C. may result in frost formation on the evaporator. Frost formation decreases the efficiency of the cooling unit and eventually may completely block the flow of circulating air. Avoiding this requires periodic defrost cycles. Many types of defrost cycles exist. All or many of them typically require an interruption of the cooling process. Most of them rely on a way of supplying heat to the evaporator, for example using a heater mounted underneath the evaporator (see for example patent specification U.S. Pat. No. 6,609,388). Others quit cooling while continuing to circulate return air from the refrigerated transport container, when return air temperature is above 0° C. (see for example Australian patent AU200136250). The return air from the refrigerated transport container will then lose heat to the frost on the evaporator, simultaneously cooling the air and defrosting the evaporator. It is generally understood that defrost cycles should only be terminated when substantially all frost has melted and the melt water has received enough time to drain off to the outside of the cooling space through installed condensate collection guide(s).

When the setpoint temperature is close to 0° C., e.g. between +2° C. and −5° C., and the compressor is intermittently operated, for example to avoid energy-inefficient part-load operation, the external surface temperature of the evaporator may oscillate between melting and frosting conditions. An intermittently operated compressor is a compressor that operates between a first active state (e.g. ON, MAX, near MAX) and a second less active state (e.g. LOW, near OFF, OFF) in such a way that it completely or almost completely inactivates for a certain period of time after a certain (e.g. other) period of time. Typically, an intermittently operated compressor inactivates for temperature control purposes and inactivates more than 20% of time with more than 2 stops per hour. In this situation, a new issue may occur: if no further measures are taken it is inherent to the intermittent operation that cooling may resume before all frost is melted whereby ice starts to form on the evaporator or in the condensate collection guide(s). Ice is far more difficult to remove than frost. In addition, at least a part of the condensate collection guide(s) may be outside the reach of the installed heating device(s). Hence the ice formation is a serious problem. Ice formation in this way has the potential to first block the condensate collection guide(s), and after that gradually fill the lower part of the cooling space with ice, potentially completely blocking the air flow.

SUMMARY

It is an aim of the present invention to reduce, preferably avoid, ice formation inside the cooling space of a cooling unit with an intermittently operated compressor operated at a temperature setpoint where the potential risk of ice build-up on the evaporator surface exists.

In one aspect, this is achieved by altering the cycling pattern of the intermittently operated compressor in such a way that rapid cycles of melting-refreezing are avoided, without changing the time-averaged supply air temperature.

Alternatively, in a second aspect of the invention the potential risk of ice build-up is neutralized by increasing the average supply air temperature to a value just above 0° C., for example +0.2° C., in setpoint ranges where the setpoint would otherwise command an average supply air temperature between just below 0° C., for example −0.3° C., and just above 0° C., for example +0.2° C.

An aspect relates to a method of reducing and/or avoiding ice formation inside a cooling space of a refrigerated transport container comprising at least a cooling unit and an evaporator located in the cooling space, where the cooling unit comprises at least an intermittently operated compressor operated between a first active state (e.g. ON, MAX, near MAX) and a second less active state (e.g. LOW, near OFF, OFF), wherein the method comprises: reducing and/or avoiding ice formation inside the cooling space, when the system is operated at a temperature setpoint where a potential risk of ice build-up on the external surface of the evaporator exists, by altering a cycling of the compressor between the first active state and the second less active state such that the number of melting-refreezing cycles at an external surface of the evaporator is reduced.

Temperature setpoints where a potential risk of ice build-up on the external surface of the evaporator exists, are those temperature setpoints where air temperatures in the cooling space may rise above 0° C. in periods where the compressor resides in the second less active state, while on average these temperatures are below zero; this typically concerns setpoints in the range between −5° C. and 0° C.

Reducing and/or avoiding ice formation in the cooling space helps to maintain a clean external evaporator surface area and open condensate collection guide(s). This in turn helps to ensure the proper drain off of melting water to outside the container and the persistent proper functioning of the cooling unit.

In one embodiment, the method comprises: altering the cycling of the compressor between the first active state and the second less active state to avoid the occurrence of melting conditions during periods where the compressor is in the second less active state by extending existing compressor cycling control with a condition to change the compressor state to the first active state as soon as a warmest temperature in the cooling space exceeds 0° C., e.g. +p1, where p1 is a tuning parameter.

This is a simple way to avoid the occurrence of melting conditions in the cooling space, and it may simply be added to any conceivable control logic for intermittent compressor operation and does not necessarily require the installation of extra temperature sensors as it will work with existing temperature sensors.

In one embodiment, the warmest temperature is the maximum of one or more of: a measured supply air temperature, and/or a measured return air temperature, and/or a temperature measured by a defrost termination sensor located on the external surface of the evaporator.

In this way, there will normally not be a requirement of installation of extra temperature sensors, as these temperatures are readily available from existing temperature sensors found in most systems. Temperature sensors, which are usually present in a cooling space are a supply air temperature sensor, a return air temperature sensor and a defrost termination sensor. The use of one or more of these sensors e.g. in combination with a properly tuned parameter p1 will provide an adequate signal to identify when a warmest temperature inside the cooling space reaches 0° C.

In one embodiment, the method further comprises: a step of avoiding a reduction of time-averaged supply air temperature which would otherwise be caused by one or more earlier changes of the compressor state to the first active state.

This advantageously removes the risk of freezing injury to the produce carried in the transport volume. Without this measure the time-averaged supply air temperature might be reduced due to the additional logic forcing the compressor to start when the warmest temperature in the cooling unit exceeds a limit value close to 0° C. This logic will be active at setpoints in the range between about −5° C. and 0° C. Especially in this range, where a potential risk of ice build-up on the external surface of the evaporator exists, it is important to avoid reduction of time-averaged supply air temperature.

In one embodiment, the step of avoiding a reduction of time-averaged supply air temperature is: changing the compressor state to the first active state when an indicator, positively correlated to supply air temperature minus target supply air temperature, exceeds a first indicator threshold, and/or changing the compressor state to the first active state when the indicator has a value above a second indicator threshold at a moment that the warmest temperature measured in the cooling space becomes larger than 0° C. (e.g. +p1; where p1 is a tuning parameter), where the first indicator threshold is larger than the second indicator threshold.

On the one hand this approach advantageously controls the indicator within a preset bandwidth [second indicator threshold also later referred to as TEI_lim2, first indicator threshold also later referred to as TEI_lim1], and hence ensures that time-averaged supply air temperature remains close to target supply air temperature. On the other hand, the approach advantageously starts the compressor whenever temperature in the cooling space is close to exceeding 0° C. while the time-averaged supply air temperature is not too low.

In one embodiment, the indicator is an integral (i.e. temperature-error integral) over observed supply air temperature minus target supply air temperature.

It is attractive to use the temperature-error integral as an indicator, because it ensures that time-averaged supply air temperature remains exactly equal to target supply air temperature.

In one embodiment, the method further comprises: neutralizing a potential risk of ice build-up by increasing the average supply air temperature to a value above about 0° C. (for example +0.2° C.) in temperature setpoint ranges where the temperature setpoint would otherwise command an average supply air temperature between below about 0° C. (for example −0.3° C.) and above about 0° C. (for example +0.2° C.).

Increasing the average supply air temperature to a value just above 0° C., for example +0.2° C., ensures that in the cooling space melting conditions prevail over freezing conditions. This obviously is a very reliable and effective approach to solve the problem of ice accumulation. For temperature setpoints of, for example, −20° C. it would be unacceptable from a cargo-quality point of view. For cargos carried around 0° C. the negligible cargo-quality effect of at most, for example, 0.5° C. temperature elevation is easily outweighed by the advantage of no ice accumulation.

In one embodiment, the method comprises changing the compressor state to the first active state if the compressor is currently in the second less active state and if:
  an indicator is above a first indicator threshold, and/or
  an indicator is below the first indicator threshold and above the second indicator threshold and a temperature setpoint is above a predetermined temperature value, e.g. selected from the interval between about +0.5° C. to about −1.0° C., and/or
  an indicator is below the first indicator threshold and above the second indicator threshold and a temperature setpoint is below the predetermined temperature value, e.g. selected from the interval between about +0.5° C. to about −1.0° C., and
    either a supply air temperature is larger than about 0° C. while the supply air temperature was less than about 0° C. at a previous time instance and a return air temperature is less than about 0° C., or
    a return air temperature is larger than about 0° C. while the return air temperature was less than about 0° C. at a previous time instance and a supply air temperature (Tsup) is less than about 0° C.

The above embodiment advantageously ensures that for setpoints above the predetermined temperature value, where there is no risk of ice formation, the compressor cycles in a regular pattern between its two states. On the other hand the same embodiment also ensures that for setpoints below the predetermined temperature value, where there a risk of ice formation exists indeed, some periods where the compressor is in the second less active state terminate before melting starts, while other periods where the compressor is in the second less active state are prolonged to allow for extended periods of melting conditions. Yet this all happens without affecting the time-averaged supply air temperature.

In one embodiment, the method comprises:
  if the compressor is currently in the second less active state and if an indicator is larger than the setpoint temperature, e.g. plus an offset, and the temperature setpoint is below a predetermined temperature value, e.g. selected from the interval between about +0.5° C. to about −1.0° C., and
    if a further indication specifies that the compressor should not be in the second less active state for a long period of time then changing the compressor state to the first active state, or
    if the further indication specifies that the compressor should be in the second less active state for a long period of time then wait to change the compressor state to the first active state until a predetermined period of time has elapsed or until a measured supply air temperature and/or a measured return air temperature reaches a predetermined value.

The above embodiment has comparable advantages as the previous embodiment, because it has the potential to achieve a very comparable pattern of cycling between the two compressor states. In this embodiment a long period is a period preferably long enough to facilitate the melting and drain off of all frost from the evaporator. Such a long period should preferable include at least about 10 minutes of melting conditions.

In one embodiment, the refrigerated transport container is not a transport container but another type of refrigerated space in connection with a cooling unit. This could e.g. be an item of refrigerated road transport equipment, a reefer ship, or any type of stationary cold storage room.

Another aspect relates to a system for reducing and/or avoiding ice formation inside a cooling space of a refrigerated transport container comprising at least a cooling unit and an evaporator located in the cooling space, where the cooling unit comprises at least an intermittently operated compressor operated between a first active state and a second less active state, and wherein the system comprises a processing unit adapted to reduce and/or avoid ice formation inside the cooling space, when the system is operated at a temperature setpoint where a potential risk of ice build-up on the external surface of the evaporator exists, by altering a cycling of the compressor between the first active state and the second less active state such that the number of melting-refreezing cycles at an external surface of the evaporator is reduced.

The embodiments of the system correspond to the embodiments of the method and have the same advantages for the same reasons.

BRIEF DESCRIPTION OF THE DRAWINGS

Preferred embodiments of the invention will be described in more detail in connection with the appended drawings, in which.

DESCRIPTION OF PREFERRED EMBODIMENTS

Figure 1:
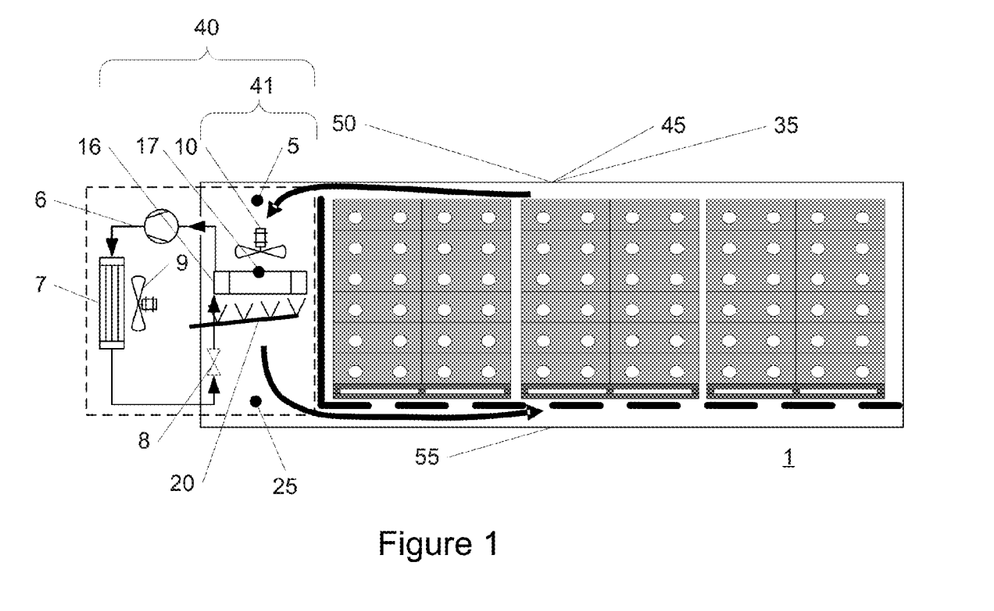
FIG. 1 schematically illustrates a simplified longitudinal cross-sectional view of a refrigerated space in the form of a refrigerated transport container.

FIG. 1 schematically illustrates a simplified longitudinal cross-sectional view of a refrigerated space in the form of a refrigerated transport container. FIG. 1 illustrates one example of a refrigerated transport container 1 comprising a frontal section having a cooling or refrigeration unit or system 40 and a load/cargo section or transport volume 45. The transport volume 45 of the refrigerated transport container 1 comprises a commodity load e.g. comprising a plurality of stackable transport cartons or crates 35 arranged within the transport volume 45 such as to leave appropriate clearance at a ceiling and a floor structure for air flow passages above and beneath the commodity load.

The cooling unit 40 in this example comprises a so-called vapour compression refrigeration circuit and a cooling space 41. The refrigeration circuit comprises at least a compressor 6, a condenser 7 with one or more condenser fans 9, an expansion device 8, an evaporator 16 with one or more evaporator fans 10, and a condensate collection guide(s) 20 mounted underneath the evaporator 16. The compressor 6 and the condenser 7 with the one or more condenser fans 9 are typically situated outside the insulated enclosure of the transport container 1. The evaporator 16 may also comprise a so-called defrost termination sensor 17 measuring the temperature of the external surface of the evaporator 16.

The cooling space 41 is situated inside the insulated enclosure of the transport container 1. The cooling space 41 is normally separated from the transport volume 45 by a panel equipped with one or more openings to allow a return air flow 50 into the cooling space 41 and a supply air flow 55 out of the cooling space 41. The air flow through the cooling space is maintained by one or more evaporator fans 10.

A control system (not illustrated) comprises a programmed microprocessor or the like which controls the cycling of the intermittently operated compressor 6 in accordance with a control algorithm defined by a set of microprocessor program instructions. The control system may additionally comprise a user interface, for example a LCD display, where an operator or ship technician can enter or modify certain parameter values of the control algorithm such as a setpoint temperature of the refrigerated transport container 1, etc.

Figure 2:
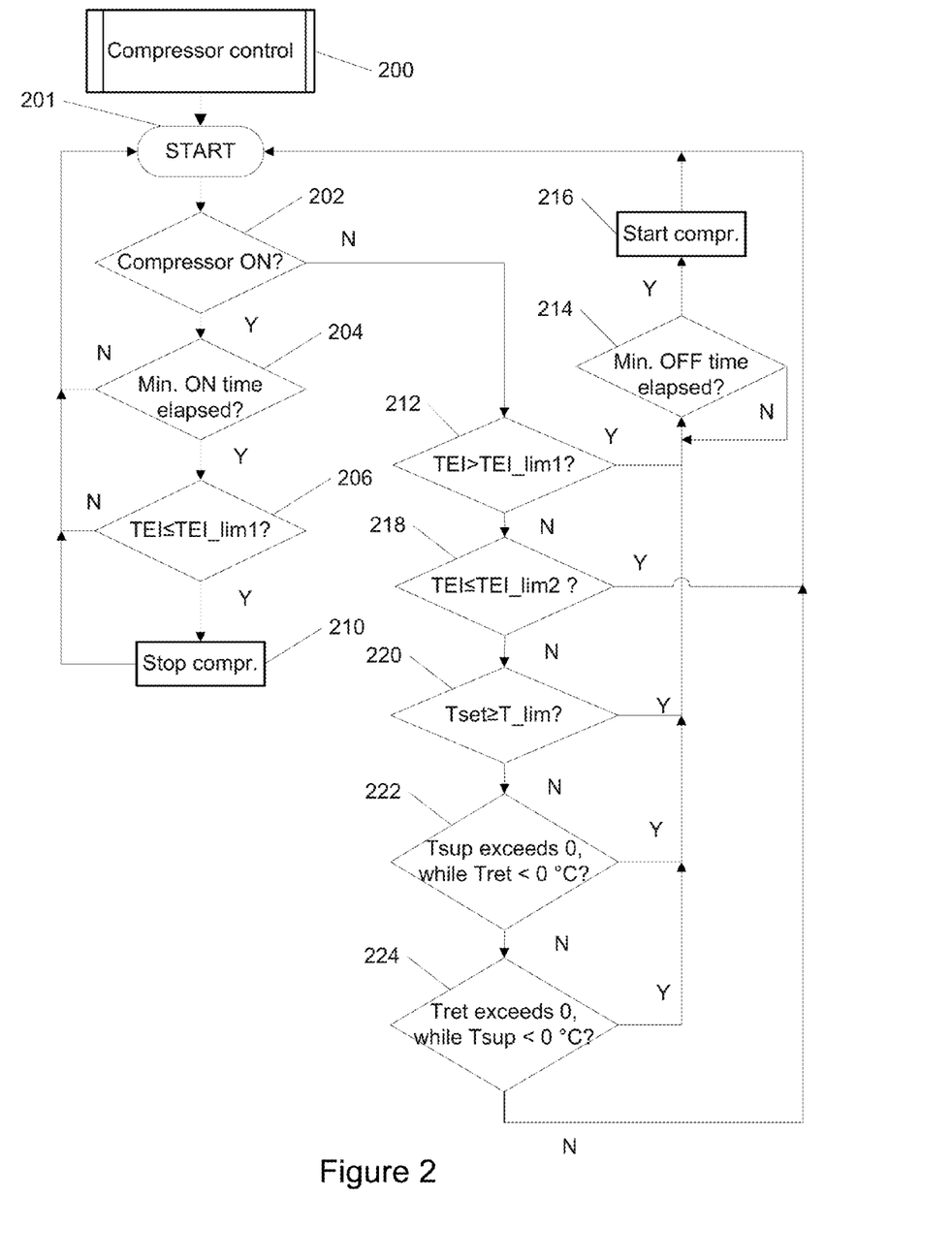
FIG. 2 is a flow chart illustrating steps executed by a microprocessor-implemented algorithm or program of a control system of a refrigerated transport container to reduce and/or avoid ice formation in a cooling space of a refrigerated transport container.

FIG. 2 is a flow chart illustrating steps executed by a microprocessor-implemented algorithm or program (200) of a control system of a cooling unit with an intermittently operated compressor. At setpoints above a predetermined value T_lim, e.g. −0.3° C., it will cause a regular compressor cycling pattern (like in FIG. 3). At setpoints below the predetermined value T_lim, it causes a controlled irregularity in the compressor cycling pattern (like in FIG. 4) to reduce and/or avoid ice formation in a cooling space of the refrigerated transport container.

The algorithm controls the compressor (not shown; see e.g. 6 in FIG. 1) between a first active state (e.g. ON, MAX, near MAX; forth only denoted ON) and a second less active state (e.g. OFF, near OFF, LOW; forth only denoted OFF) to avoid and/or reduce ice formation in a cooling space (not shown; see e.g. 41 in FIG. 1) of the refrigerated transport container (not shown; see e.g. 1 in FIG. 1). The algorithm starts in step 201 and proceeds to step 202 where it is tested whether the compressor is ON or not, i.e. being OFF.

If the test in step 202 is yes, i.e. the compressor is ON, the method proceeds to step 204 where it is tested whether a minimum period of time for the compressor being ON has elapsed or not. The minimum period of time for a compressor ON cycle or state may e.g. be three minutes but can depend on the system, settings, etc. The primary reason for having minimum ON and OFF times is protection of unit hardware including compressor lubrication and contactor wear.

It the test in step 202 is no, i.e. the compressor is OFF, the method proceeds to the step 212 as will be explained later.

It the test in step 204 is no, i.e. the minimum period of time for a compressor ON cycle or state has not elapsed, the method proceeds back to the starting step 202, as no change of the state of the compressor is then allowed.

If the test in step 204 is yes, the method proceeds to step 206 where it is tested whether a current value of a temperature-error integral (TEI) is less or equal to a first threshold, TEI_lim1, which constitutes an integral error threshold for when the compressor should be ON. In one embodiment, the first threshold, TEI_lim1, is 90° C.*min.

The temperature-error integral (TEI) is the (true) integral over the supply air temperature minus setpoint Tset, being a reference temperature to which time-averaged supply air temperature may be controlled. The supply air temperature may e.g. be obtained by a supply air temperature sensor (see e.g. 25 in FIG. 1) adapted to measure temperature of supply air (see e.g. 55 in FIG. 1) discharged into the transport volume (see e.g. 45 in FIG. 1) through an air flow passage.

If the test in step 206 is no, signifying that cooling is still required, the method proceeds to the starting step 201.

If the test in step 206 is yes, i.e. cooling is no longer required based on the current value of the temperature-error integral (TED, the method proceeds to step 210, where the compressor is turned OFF, before continuing back to the starting step 201.

If the test in step 202 is no, i.e. the compressor is OFF, the method proceeds to step 212 instead of proceeding to step 204 as described above.

In step 212 it is tested whether the current value of the temperature-error integral (TEI) is larger than the first threshold, TEI_lim1.

If yes, there is a need for cooling and the compressor should be turned ON. Therefore the method then proceeds to step 214 where it is tested whether a minimum period of time for the compressor being OFF has elapsed or not. If the minimum period of time has elapsed, the method proceeds to step 216, where the compressor is started, after which the method continues to the starting step 201.

If the test in step 214 is no, i.e. the minimum period of time has not elapsed, it loops back to step 214. This will continue until the minimum period of time has elapsed. In this respect, step 214 is a check and delay, delaying until the minimum period of time for the compressor being OFF has elapsed.

If the test in step 212 is no, i.e. the current value of the temperature-error integral (TEI) is less than or equal to the first threshold TEI_lim1, the method proceeds to step 218, where it is tested whether the current value of the temperature-error integral (TEI) is less than or equal to a second TEI threshold, TEI_lim2. The second TEI threshold may be dependent on the first TEI threshold TEI_lim1. In one embodiment, the second TEI threshold is the first threshold TEI_lim1 minus a certain factor, e.g. 20° C.*min., so the second TEI threshold will be 70° C.*min.

If the test in step 218 is yes, i.e. the current value of the temperature-error integral (TEI) is less than or equal to the second threshold TEI_lim2, the method proceeds to the starting step 201 without any changes of the compressor state.

If the test in 218 is no, i.e. the current value of the temperature-error integral (TEI) is larger than the second threshold TEI_lim2, the method proceeds to step 220 where it is tested whether Tset, the temperature setpoint, is equal to or larger than a predetermined value T_lim. The value T_lim should be close to 0° C. and may e.g. be −0.3° C. or +0.2° C. If the test of step 220 is yes, the method proceeds to the check and delay step 214, checking and/or waiting for the minimum period of compressor OFF time has passed before starting the compressor in step 216. When Tset is larger than T_lim, the compressor cycling pattern will be like in FIG. 3, without any irregularity imposed on the compressor cycling because at setpoints above T_lim there is no risk of ice formation on or below the evaporator.

If the test of step 220 is no, there indeed is a risk of ice formation on or below the evaporator and hence the irregular compressor cycling pattern (like in FIG. 4) is desired. To achieve that, the method proceeds to step 222 where it is tested whether the return air temperature Tret is less than 0° C., and the supply air temperature Tsup is larger than 0° C. while it was less than 0° C. at the previous call to step 222, i.e. Tsup crossed 0° C. since the last call to step 222.

If the test of step 222 is yes, the method continues to step 214 starting the compressor (e.g. after a delay as described earlier).

If the test of step 222 is no, the method proceeds to step 224 where it is tested whether the supply air temperature Tsup is less than 0° C., and the return air temperature Tret is larger than 0° C. while it was less than 0° C. at the previous call to step 224, i.e. Tret crossed 0° C. since the last call to step 224.

If the test of step 224 is yes, the method continues to step 214 starting the compressor (e.g. after a delay as described earlier) while if the test of step 224 is no, the method proceeds to the starting step 201 without changing the state of the compressor.

In relation to the tests of steps 222 and 224 where it is tested whether the supply or return air temperatures cross 0° C. it alternatively can be tested whether the maximum of Tsup, Tret and evaporator surface temperature, measured by the defrost termination sensor, is larger than 0° C.+p1° C. while at the previous call to step 222 and 224 that was not the case, where p1 is a tuning parameter. p1 may e.g. be −0.1° C. In this way, the compressor is started at a lower temperature than 0° C., which provides extra robustness for small sensor value deviations, etc.

In an alternative embodiment, the return air temperature Tret may be used instead of the temperature-error integral (TEI) in steps 206 and 212 while not performing step 218.

In step 206 it would then be tested whether the return air temperature Tret is less than or equal to the setpoint temperature Tset minus an offset (Tret_lim1). In step 212 it would then be tested whether the return air temperature Tret is larger than the setpoint temperature Tset plus the same or a different offset (Tret_lim2). Ice formation at or below the evaporator could then be suppressed by enforcing a long compressor OFF period, facilitating a long period of melting conditions in the cooling space. A long compressor OFF period may be enforced by letting the compressor being OFF for a predetermined period of time or being OFF until the supply air temperature and/or the return air temperature reaches a predetermined value The decision to enforce a long compressor OFF period may e.g. be taken after a predetermined number of compressor OFF periods, e.g. 4, has been terminated by steps 222 or 224, or each time the previous long compressor OFF period terminated more than a predetermined period of time ago. As yet another alternative, in step 206 and 212 the supply air temperature could replace the return air temperature.

Figure 3:
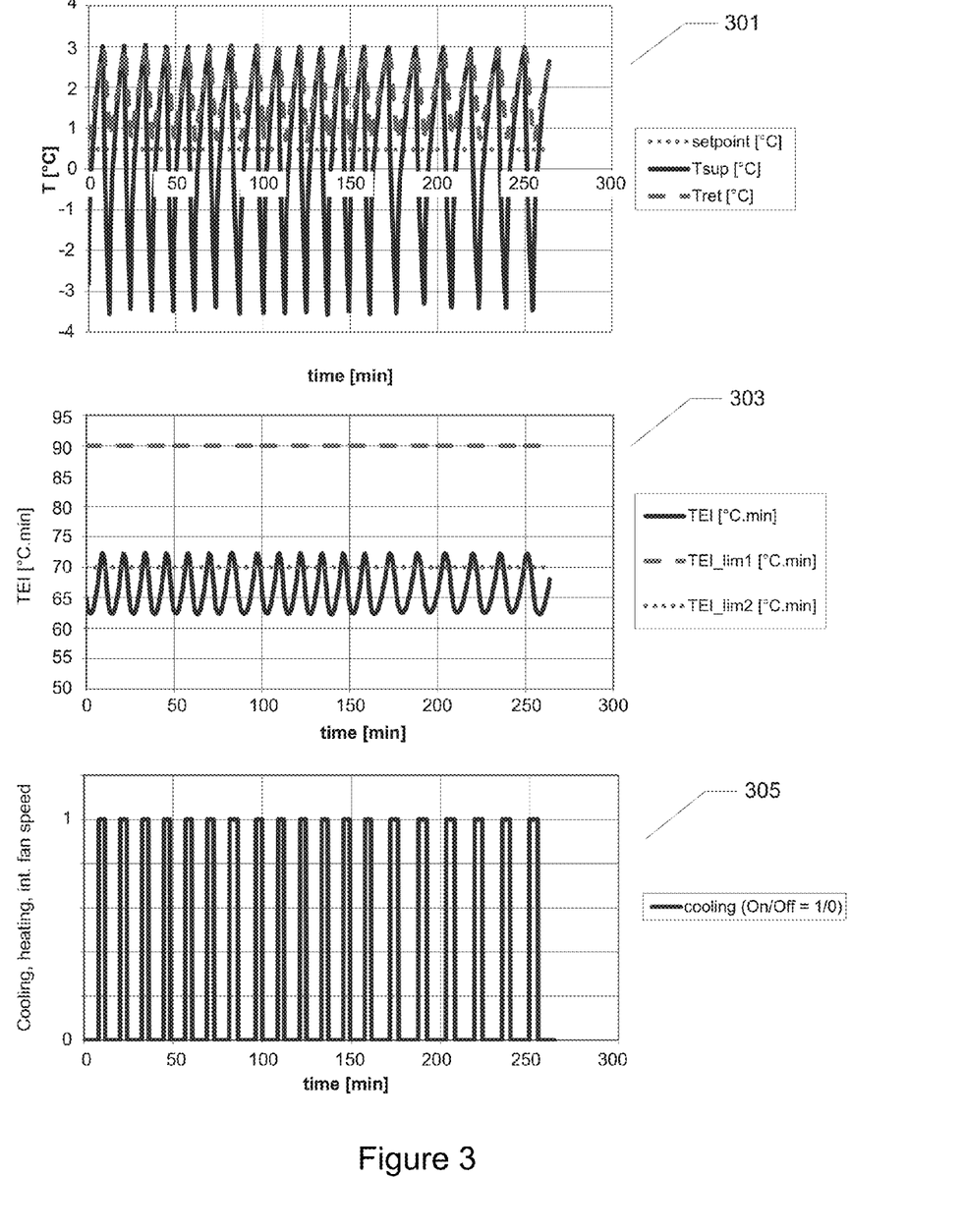
FIG. 3 shows data for operation of a system with an intermittently operated compressor with a regular cycling pattern at a setpoint just above 0° C.
Figure 4:
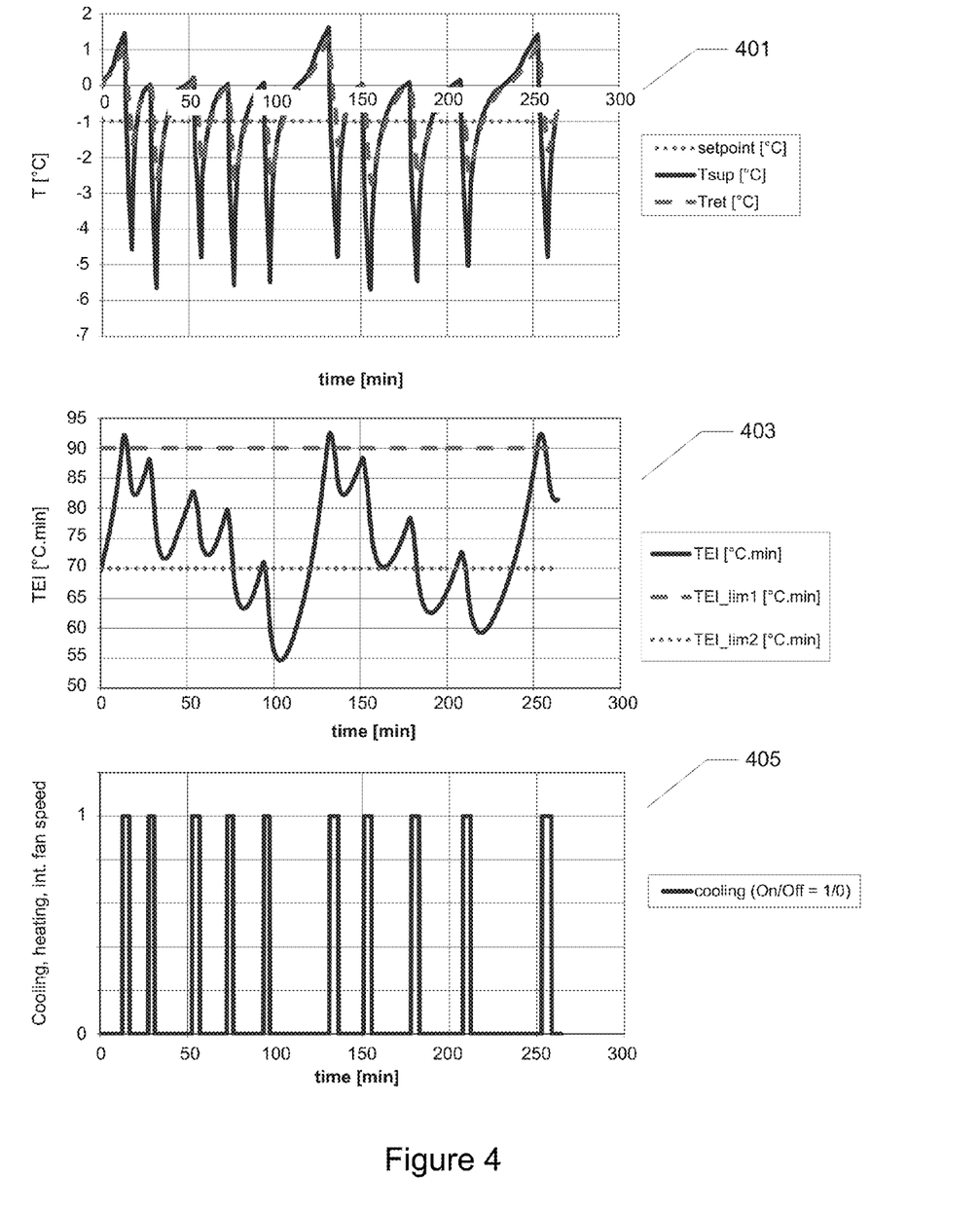
FIG. 4 shows data for operation of a system with an intermittently operated compressor with a setpoint just below a predetermined value T_lim, e.g. −0.3° C., where the cycling pattern is manipulated with the objective to avoid rapid melting-refreezing cycles, while maintaining accurate control over time-averaged supply air temperature.

The method will be explained further in connection with FIGS. 3 and 4 showing measured data using the method of FIG. 2.

FIG. 3 shows data for operation with a setpoint just above T_lim while FIG. 4 shows data for operation with a setpoint just below T_lim.

Shown in FIG. 3 are three graphs 301, 303, and 305 illustrating the development of various data and parameters, as measured in an empty refrigerated transport container. Graph 301 illustrates the development of supply and return air temperatures (Tsup, Tret), shown as a full line and a broken line respectively, with the setpoint temperature indicated by the dotted line.

As can be seen, the supply air temperature varies or cycles between about 3° C. and about −3.5° C. while return air temperature varies or cycles between about 3° C. and 1° C. (on average a bit above the setpoint temperature). This data is for an empty refrigerated transport container. With cargo the return air temperature will generally be more stable.

The regular cycling of temperatures is due to the regular compressor ON and OFF cycling as indicated in Graph 305.

Graph 303 illustrates the development of the temperature-error integral (TEI) as a function of time (full line). Graph 303 also indicates the first TEI threshold, TEI_lim1 (dashed line), and the second TEI threshold, TEI_lim2 (dotted line), e.g. as used in steps 206, 212, and 218 of the method in FIG. 2. In this example, the first TEI threshold is 90° C.*min. while the second TEI threshold is 70° C.*min.

As can be seen, the temperature-error integral (TEI) goes down when the supply air temperature is below setpoint and rises again when the supply air temperature is above setpoint. As soon as the temperature-error integral exceeds the second TEI threshold, TEI_lim2, then in FIG. 2 test 218 is no and 220 is yes and the compressor will be switched ON after the minimum OFF time for the compressor (step 214) has elapsed.

Graph 305 illustrates the state (either being ON or OFF) of the compressor (full line) as a function of time.

The graphs 301, 303, 305 show a regular cycle pattern of the compressor and related variables. The graphs in FIG. 4 show an irregular cycle pattern.

The irregular cycle of FIG. 4 is designed to avoid and/or reduce ice formation in the cooling space of the refrigerated transport container as have been explained in connection with FIG. 2.

Shown in FIG. 4 are three graphs 401, 403, and 405 illustrating the development of various data and parameters, as measured in an empty refrigerated transport container. Graph 401 illustrates the development of supply and return air temperatures (Tsup, Tret), shown as a full line and a broken line respectively, with the setpoint temperature indicated by the dotted line.

As can be seen, the supply air temperature varies or cycles between about 1.5° C. and about −5° C. while return air temperature varies or cycles between about 0° C. and −2.5° C. (on average a bit above the setpoint temperature). This data is for an empty refrigerated transport container. With cargo the return air temperature will generally be more stable.

This irregular cycling of temperatures is due to the irregular compressor ON and OFF cycling as indicated in Graph 405 and as controlled by the method according to FIG. 2.

Graph 403 illustrates the development of the temperature-error integral (TEI) as a function of time (full line). Graph 403 also indicates the first TEI threshold, TEI_lim1 (dashed line), and the second TEI threshold, TEI_lim2 (dotted line), e.g. as used in steps 206, 212, and 218 of the method in FIG. 2. In this example, the first TEI threshold is 90° C.*min. while the second TEI threshold is 70° C.*min.

Graph 405 illustrates the state (either being ON or OFF) of the compressor (full line) as a function of time.

The situation depicted by graphs 401, 403, and 405 shows an irregular cycle designed to avoid and/or reduce ice formation in the cooling space.

The more regular cycle in FIG. 3 and the more irregular cycle of FIG. 4 are due to the test 220 in FIG. 2, which is yes for the situation of FIG. 3 and no for the situation of FIG. 4. The situation of FIG. 3 makes the compressor start whenever, the temperature-error integral (TEI) is larger than the second TEI threshold, TEI_lim2.

In the situation of FIG. 4, there are additional conditions (steps 222 and 224 of FIG. 2) for switching the compressor ON, and those additional conditions cause the more irregular cycling.

The steps 222 and 224 of FIG. 2 switch the compressor ON whenever supply or return air temperature crosses 0° C. while the other is below 0° C. This prevents melting of frost in the cooling space, by shortening the periods of the compressor being OFF. This however, also reduces the average supply air temperature causing the temperature-error integral TEI to decrease over time. This negative trend continues until either supply or return air temperature crosses 0° C. before the temperature-error integral TEI rises up to the second TEI threshold. Once that happens, the compressor will only start again when the temperature-error integral TEI value is larger than the first TEI threshold, TEI_lim1, and step 212 becomes yes. This causes one long period with melting conditions in the cooling space which reduces the risk of ice formation compared to multiple short periods with melting conditions. At the same time, the temperature-error integral TEI value is restored avoiding violation of temperature control requirements with respect to time-averaged supply air temperature.

What is claimed is:

1. A method of reducing and/or avoiding ice formation inside a cooling space of a refrigerated transport container comprising at least a cooling unit and an evaporator located in the cooling space, where the cooling unit comprises at least an intermittently operated compressor operated between a first active state and a second less active state, wherein the method comprises:

using an integral (TEI) over a period of time of an observed supply air temperature minus target supply air temperature as an indicator, and reducing and/or avoiding ice formation inside the cooling space, when the system is operated at a temperature set point where a potential risk of ice build-up on the external surface of the evaporator exists, by altering a cycling of the compressor between the first active state and the second less active state such that the number of melting-refreezing cycles at an external surface of the evaporator is reduced by changing the compressor state to the first active state if the compressor is currently in the second less active state when:
  TEI is above a first indicator threshold (TEI_lim1), or
  TEI is below the first indicator threshold (TEI_lim1) and above the second indicator threshold (TEI_lim2) and a warmest measured temperature in the cooling space becomes greater than about 0° C.,
  where the first indicator threshold (TEI_lim1) is greater than the second indicator threshold (TEI_lim2).

2. The method according to claim 1, wherein the warmest temperature is the maximum of one or more of: a measured supply air temperature (Tsup), and/or a measured return air temperature (Tret), and/or a temperature measured by a defrost termination sensor located on the external surface of the evaporator.

3. The method according to claim 1, wherein the method further comprises:
  a step of avoiding a reduction of time-averaged supply air temperature which would otherwise be caused by one or more earlier changes of the compressor state to the first active state.

4. The method according to claim 1, wherein the method comprises:
  if the compressor is currently in the second less active state and if the indicator max(Tsup, Tret) is larger than the setpoint temperature (Tset) and the temperature setpoint (Tset) is below a predetermined temperature value (T_lim), and
  if a further indication specifies that the compressor should not be in the second less active state for a long period of time then changing the compressor state to the first active state, or
  if the further indication specifies that the compressor should be in the second less active state for a long period of time then wait to change the compressor state to the first active state until a predetermined period of time has elapsed or until a measured supply air temperature (Tsup) and/or a measured return air temperature (Tret) reaches a predetermined value.

5. The method according to claim 1, wherein the refrigerated transport container is not a transport container but another type of refrigerated space in connection with a cooling unit.

6. A system for reducing and/or avoiding ice formation inside a cooling space of a refrigerated transport container comprising at least a cooling unit and an evaporator located in the cooling space, where the cooling unit comprises at least an intermittently operated compressor operated between a first active state and a second less active state, and wherein the system comprises a processing unit adapted to:
  use an integral (TEI) over a period of time of an observed supply air temperature minus target supply air temperature as an indicator, and
  reduce and/or avoid ice formation inside the cooling space, when the system is operated at a temperature set point where a potential risk of ice build-up on the external surface of the evaporator exists, by altering a cycling of the compressor between the first active state and the second less active state such that the number of melting-refreezing cycles at an external surface of the evaporator is reduced by changing the compressor state to the first active state if the compressor is currently in the second less active state when:
  TEI is above a first indicator threshold (TEI_lim1), or
  TEI is below the first indicator threshold (TEI_lim1) and above the second indicator threshold (TEI_lim2) and a warmest measured temperature in the cooling space becomes greater than about 0° C.,
  where the first indicator threshold (TEI_lim1) is greater than the second indicator threshold (TEI_lim2).

7. The system according to claim 6, wherein the warmest temperature is the maximum of one or more of: a measured supply air temperature (Tsup), and/or a measured return air temperature (Tret), and/or a temperature measured by a defrost termination sensor located on the external surface of the evaporator.

8. The system according to claim 6, wherein the processing unit is adapted to:
  avoid a reduction of time-averaged supply air temperature which would otherwise be caused by one or more earlier changes of the compressor state to the first active state.

9. The system according any claim 6, wherein the compressor state is additionally changed to the first active state if the compressor is currently in the second less active state and if:
  the indicator is below the first indicator threshold (TEI_lim1) and above the second indicator threshold (TEI_lim2) and a temperature setpoint (Tset) is above a predetermined temperature value (T_lim), or
  the indicator is below the first indicator threshold (TEI_lim1) and above the second indicator threshold (TEI_lim2) and a temperature setpoint (Tset) is below the predetermined temperature value (T_lim), and
  either a supply air temperature (Tsup) is larger than about 0° C. while the supply air temperature (Tsup) was less than about 0° C. at a previous time instance and a return air temperature (Tret) is less than about 0° C. or a return air temperature (Tret) is larger than about 0° C. while the return air temperature (Tret) was less than about 0° C. at a previous time instance and a supply air temperature (Tsup) is less than about 0° C.

10. The system according to claim 6, wherein the processing unit is adapted to:
  if the compressor is currently in the second less active state and if the indicator (Tsup, Tret) is larger than the setpoint temperature (Tset) and the temperature setpoint (Tset) is below a predetermined temperature value (T_lim), and
  if a further indication specifies that the compressor should not be in the second less active state for a long period of time then changing the compressor state to the first active state, or
  if the further indication specifies that the compressor should be in the second less active state for a long period of time then wait to change the compressor state to the first active state until a predetermined period of time has elapsed or until a measured supply air temperature (Tsup) and/or a measured return air temperature (Tret) reaches a predetermined value.

11. The system according to claim 6, wherein the refrigerated transport container is not a transport container but another type of refrigerated space in connection with a cooling unit.

* * * * *